Sept. 8, 1936.   C. A. OTTO   2,053,492
TEMPERATURE CONTROL
Filed Nov. 16, 1935
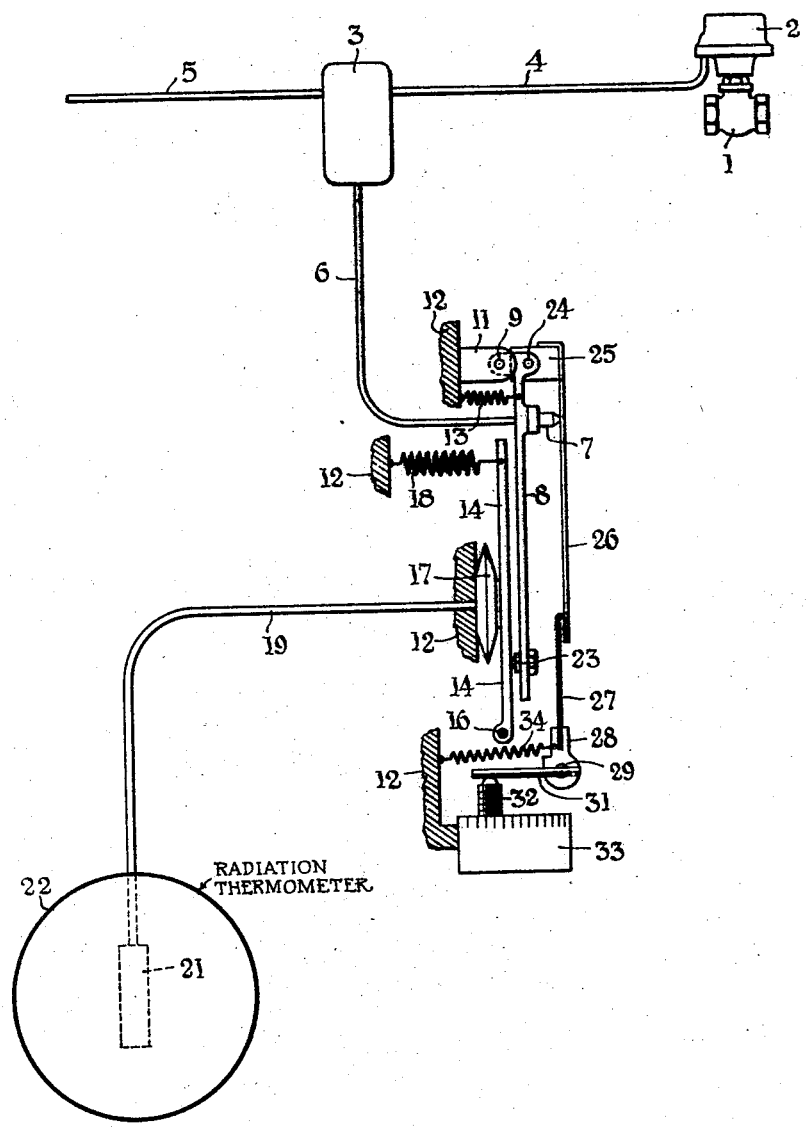

Patented Sept. 8, 1936

2,053,492

UNITED STATES PATENT OFFICE 2,053,492

TEMPERATURE CONTROL

Carl A. Otto, Milwaukee, Wis., assignor to Johnson Service Company, Milwaukee, Wis., a corporation of Wisconsin Application November 16, 1935, Serial No. 50,193

8 Claims. (Cl. 236—1)

This invention pertains to temperature control systems and particularly to systems in which control is exercised in accordance with a plurality of variable conditions so as to provide for maximum comfort in an enclosure.

In general, it may be said that there are at least three variables which are functions of temperature and contribute to conditions of comfort in an enclosure. These factors are (1) dry bulb temperature of the air in the enclosure, (2) relative humidity of the air, and (3) radiation of heat to or from a person in the enclosure.

While it has been proposed to control temperature in accordance with functions of the first two of these variables, it has not been proposed, so far as I am aware, to exercise control so as to include the radiation factor. By including these three variables in the control, maximum comfort may be attained under practically all conditions and the temperature may be maintained so as to be suited to persons of widely varying sensitivity.

The invention will be more fully understood by reference to the accompanying drawing in conjunction with the following specification.

In the drawing the single figure is a diagrammatic representation of a control system for a single heat controller.

A valve 1 represents the controller of some temperature changing means and might, for example, control the supply of heating medium to a radiator, unit heater, or other heating means (not shown). It is by no means essential that the controller be a valve, as this depends on the heater or cooler controlled.

The motor which actuates the controller 1 is indicated at 2 and is illustrated as the familiar bellows motor operated by compressed air, admitted and exhausted by pneumatic relay 3 through branch line 4. The relay may be of the progressive (sometimes called "intermediate") type disclosed in the patent to Otto, No. 1,500,260, July 8, 1924, and it and the associated leak port are supplied with compressed air through supply line 5 from any suitable source (not shown).

Relay 3 is connected by tube 6 with leak port 7, which is supported on a shiftable bar 8. Bar 8 is pivoted at 9 on a bracket 11 which is supported on base 12, fragments of which are indicated in the drawing. A spring 13 draws the bar toward the base.

The position of bar 8 is determined by a bar 14 which moves under the control of a thermostat responsive to heat radiation. Bar 14 is pivoted at 16 on a fixed support and is drawn against a bellows motor 17 by a light spring 18. Motor 17 is connected by tube 19 with thermostatic bulb 21 which contains a suitable expansible fluid. Bulb 21 is enclosed in a hollow globe 22 of copper, blackened on its outer surface to produce approximate "black body" conditions. This is a known device which responds to radiant heat and is intended to be typical. The globe 22 is exposed in the space whose condition is to be controlled.

The sensitivity to radiant heat is adjustable by means of a thrust pin 23 which may be shifted along bar 8 and clamped in any desired adjusted position thus changing the leverage relation between bars 14 and 8.

From the above description it will be apparent that leak port 7 moves outward (to the right in the drawing) when bulb 21 receives heat by radiation and inward when such bulb loses heat by radiation.

Pivoted at 24 on arm 8 is a weighted block 25 to which is fixed a bar 26 which serves as a lid or valve for leak port 7. The lower end of bar 26 is positioned by a bi-metallic thermostatic element 27 which shifts upon change in dry bulb temperature. Element 27 is carried by saddle 28 which is pivoted in a fixed fulcrum 29 and carries bar 31 which flexes in response to changes in atmospheric humidity (relative humidity). In practice bar 31 may be a so-called "bi-wood" element, made up of two laminae, one cut with and the other across the grain. The end of bar 31 rests on adjusting screw 32 which is threaded in a portion of base 12 and whose adjustment is indicated by arcuate dial 33. Spring 34 reacts between base 12 and saddle 28 to bias bar 31 against adjusting screw 32.

The parts may be so arranged that bar 26 and leak port 7 coact to close port 7 on rise of dry bulb temperature affecting element 27 on rise of temperature in bulb 21, and on rise of relative humidity, and conversely, to open the port on fall of any of these quantities. In practice the adjustment is the algebraic sum of the three adjustments made in response to the three variable quantities. Throttling of leak port 7 acts through relay 3 to shut off heat (close valve 1) in the case of a heating system, or supply cooling medium in the case of a cooling system.

Various modifications are common in the art, for example, reverse acting relays which can be compensated for by reversing the action of the controller or its actuating motor, or by reversing the action of the leak port in the relay. It is impracticable to illustrate such reversals, but they are well known and are not a feature of the invention, which contemplates suitably combining the effects of radiation, dry bulb temperature and relative humidity to control a temperature changing device. The mechanics by which this result is secured are secondary and involve known mechanical expedients which may be variously combined to effect the final result.

Considering dry bulb temperature as the primary controlling variable, and defining "control point" as the dry bulb temperature which the device tends to maintain, an increase in relative humidity lowers the control point, and an increase in radiant heat also lowers the control point.

The effect is to modify the control point in response to atmospheric humidity (which affects evaporation from the body) and loss or gain of radiant heat by persons in the room. In this way the best comfort conditions are approximated.

The only other variable known to affect comfort conditions is air motion and under usual room conditions this factor may be disregarded without serious results.

What is claimed is:—

1. The method of regulating temperature in an enclosed space which comprises supplying temperature changing medium at a variable rate; and regulating such rate in response to the combined effect of dry bulb temperature in the space, atmospheric humidity in the space, and variations of radiation of heat to and from a point in the space.

2. The method of regulating temperature in an enclosed space which comprises supplying temperature changing medium at a variable rate; and regulating such rate in response to the combined effect of dry bulb temperature in the space, atmospheric humidity in the space, and variations of radiation of heat to and from a point in the space, the dry bulb temperature exercising the dominant regulatory effect.

3. The method of regulating temperature in an enclosed space, which comprises supplying temperature changing medium at a variable rate; regulating such rate primarily in response to dry bulb temperature in the space, the control point for such regulation being subject to variation within limits; and varying such control point within said limits in response to the combined effects of variations of relative humidity within the space and variations of radiation of heat to and from a point in said space.

4. The method of regulating temperature in an enclosed space, which comprises supplying temperature changing medium at a variable rate; regulating such rate primarily in response to dry bulb temperature in the space, the control point for such regulation being subject to variation within limits; and varying such control point in response to the algebraic sum of two variables, (1) raising and lowering the point in inverse relation to variations of relative humidity within the space and (2) raising and lowering the point in response respectively to loss and gain of heat by radiation from and to a point in the space.

5. In a system for controlling temperature conditions in an enclosed space, the combination of means controlling the supply of a temperature changing medium to affect the temperature in said space; two relatively movable coacting elements whose approach and recession toward and from each other controls said means; and three devices, one moving in response to dry bulb temperature, another in response to atmospheric humidity, and another in response to radiant heat in said space, two of said devices being connected to shift one of said elements and the third being connected to shift the other of said elements.

6. In a system for controlling temperature conditions in an enclosed space, the combination of means for controlling a supply of temperature changing medium to affect the temperature in said space; a leak port in controlling relation with said means; a thermostat responsive to dry bulb temperature in said space, and adapted to control flow through said leak port; means responsive to atmospheric humidity for adjusting the position of said thermostat; and means responsive to heat radiation to and from a point in said space for adjusting the position of said leak port to modify the controlling effect of said thermostat.

7. In a system for controlling temperature conditions in an enclosed space, the combination of means controlling the supply of a temperature changing medium to affect the temperature in said space; two relatively movable coacting elements whose approach and recession toward and from each other controls said means; three devices, one moving in response to dry bulb temperature, another in response to atmospheric humidity, and another in response to radiant heat in said space, two of said devices being connected to shift one of said elements and the third being connected to shift the other of said elements; and adjusting means interposed between said third device and said other element, to vary the range of movement of said element in response to a given movement of said device.

8. In a system for controlling temperature conditions in an enclosed space, the combination of means for controlling a supply of temperature changing medium to affect the temperature in said space; a leak port in controlling relation with said means; a thermostat responsive to dry bulb temperature in said space, and adapted to control flow through said leak port; means responsive to atmospheric humidity for adjusting the position of said thermostat; means responsive to heat radiation to and from a point in said space for adjusting the position of said leak port to modify the controlling effect of said thermostat; and adjusting means for varying the range of movement of the leak port in response to a given variation in radiant heat.

CARL A. OTTO.